United States Patent
Tal et al.

(10) Patent No.: US 10,360,059 B2
(45) Date of Patent: Jul. 23, 2019

(54) CORRELATION OF NETWORK CONNECTIONS AND PROCESSES IN A VIRTUALIZED COMPUTING ENVIRONMENT

(71) Applicant: Guardicore Ltd., Tel Aviv (IL)

(72) Inventors: Itamar Tal, Givatayim (IL); Ariel Zeitlin, Kfar Saba (IL)

(73) Assignee: GUARDICORE LTD., Tel Aviv (IL)

(*) Notice: Subject to any disclaimer, the term of this patent is extended or adjusted under 35 U.S.C. 154(b) by 263 days.

(21) Appl. No.: 15/430,491

(22) Filed: Feb. 12, 2017

(65) Prior Publication Data
US 2018/0232248 A1    Aug. 16, 2018

(51) Int. Cl.
G06F 9/455    (2018.01)
H04L 12/26    (2006.01)
H04L 29/06    (2006.01)

(52) U.S. Cl.
CPC .......... *G06F 9/45558* (2013.01); *H04L 43/00* (2013.01); *H04L 63/00* (2013.01); *G06F 2009/45583* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| 2011/0126110 A1* | 5/2011 | Vilke | G06F 9/54 715/736 |
| 2014/0006734 A1* | 1/2014 | Li | G06F 9/45558 711/162 |

* cited by examiner

*Primary Examiner* — Kenneth Tang
(74) *Attorney, Agent, or Firm* — Kligler & Associates

(57) ABSTRACT

A method includes, in a computer, running a hypervisor that allocates resources of a memory and of a network to one or more Virtual Machines (VMs), which run VM processes and communicate over network connections. First information is extracted by monitoring the network connections in the hypervisor. Second information is extracted by directly accessing, in the hypervisor, regions of the memory assigned to the VMs. An association is established between a given network connection and a given VM process, by correlating the first information with the second information.

13 Claims, 2 Drawing Sheets

CORRELATION OF NETWORK CONNECTIONS AND PROCESSES IN A VIRTUALIZED COMPUTING ENVIRONMENT

FIELD OF THE INVENTION

The present invention relates generally to computing-system security and management, and particularly to methods and systems for correlation between network connections and processes in virtualized environments.

SUMMARY OF THE INVENTION

A method includes running in a computer a hypervisor that allocates resources of a memory and of a network to one or more Virtual Machines (VMs), which run VM processes and communicate over network connections. First information is extracted by monitoring the network connections in the hypervisor. Second information is extracted by directly accessing, in the hypervisor, regions of the memory assigned to the VMs. An association is established between a given network connection and a given VM process, by correlating the first information with the second information.

In some embodiments, establishing the association includes (i) identifying, by monitoring the network connections, a VM that is associated with the given network connection, and (ii) identifying, by directly accessing a region of the memory assigned to the identified VM, that the given process is associated with the given network connection. In some embodiments, accessing the region of the memory includes accessing a data structure, which is managed by a guest operating system of the VM and indicates the given process. Accessing the data structure may include reconstructing a physical address of the data structure in the memory, and accessing the data structure directly in the memory at the physical address.

In an embodiment, reconstructing the physical address includes cloning the guest operating system, and creating in the cloned guest operating system a process that queries the cloned guest operating system for the physical address and exports the queried physical address. In another embodiment, reconstructing the physical address includes accessing, on a virtual disk allocated to the guest operating system, a file that indicates the physical address. In yet another embodiment, reconstructing the physical address includes accessing the guest operating system via a cache that caches previously-reconstructed physical addresses.

In a disclosed embodiment, accessing the data structure includes finding a match to one or more parameters of the given connection in a list of currently-active processes of the guest operating system. In another embodiment, accessing the data structure includes finding a match to one or more parameters of the given connection in a Transmission Control Protocol/Internet Protocol (TCP/IP) lookup table of the guest operating system. In alternative embodiments, extracting the second information includes periodically polling the regions of the memory.

There is additionally provided, in accordance with an embodiment of the present invention, an apparatus including a memory and a processor. The processor is configured to run a hypervisor that allocates resources of the memory and of a network to one or more Virtual Machines (VMs), which run VM processes and communicate over network connections, to extract first information by monitoring the network connections in the hypervisor, to extract second information by directly accessing, in the hypervisor, regions of the memory assigned to the VMs, and to establish an association between a given network connection and a given VM process, by correlating the first information with the second information.

There is further provided, in accordance with an embodiment of the present invention, a computer software product, the product including a tangible non-transitory computer-readable medium in which program instructions are stored, which instructions, when read by a processor, cause the processor to run a hypervisor that allocates resources of the memory and of a network to one or more Virtual Machines (VMs), which run VM processes and communicate over network connections, to extract first information by monitoring the network connections in the hypervisor, to extract second information by directly accessing, in the hypervisor, regions of the memory assigned to the VMs, and to establish an association between a given network connection and a given VM process, by correlating the first information with the second information.

The present invention will be more fully understood from the following detailed description of the embodiments thereof, taken together with the drawings in which:

DETAILED DESCRIPTION OF EMBODIMENTS

Overview

Embodiments of the present invention that are described herein provide methods and systems for correlating network connections with Virtual Machine (VM) processes in virtualized computing environments. The disclosed techniques can be used, for example, for detecting security threats, as well as for general-purpose system management.

In some disclosed embodiments, a computer in a computing system runs a hypervisor that hosts one or more VMs. The hypervisor comprises a correlation module that correlates network connections with the VMs that use them. The correlation process is based on two types of access to information available in the hypervisor—(i) communication traffic exchanged with the VMs, and (ii) data structures relating to processes running in the VM guest Operating Systems (OSs).

Various example techniques for performing these two types of access are described herein. In particular, disclosed embodiments provide techniques for identifying the physical locations in which the desired data structures are stored in the VM memory, which may vary from one VM to another as well as over time.

The methods and system described herein exploit the unique access of the correlation module to hypervisor information, for correlating network connections with VM processes. By obtaining the necessary information from within the hypervisor, the disclosed techniques eliminate the need to run dedicated agents within the VMs. Since the VMs cannot always be guaranteed to be secure, performing agent-less correlation from outside the VMs provides a high degree of security. For example, agent-less correlation is not prone to attacks that blind the agent or falsify the information it provides. Agent-less correlation is also simpler to deploy and can be applied to third-party VMs. Moreover, the disclosed techniques do not involve any sort of Deep Packet Inspection (DPI), and are therefore fast and accurate, and involve only modest computational complexity.

System Description

Figure 1:
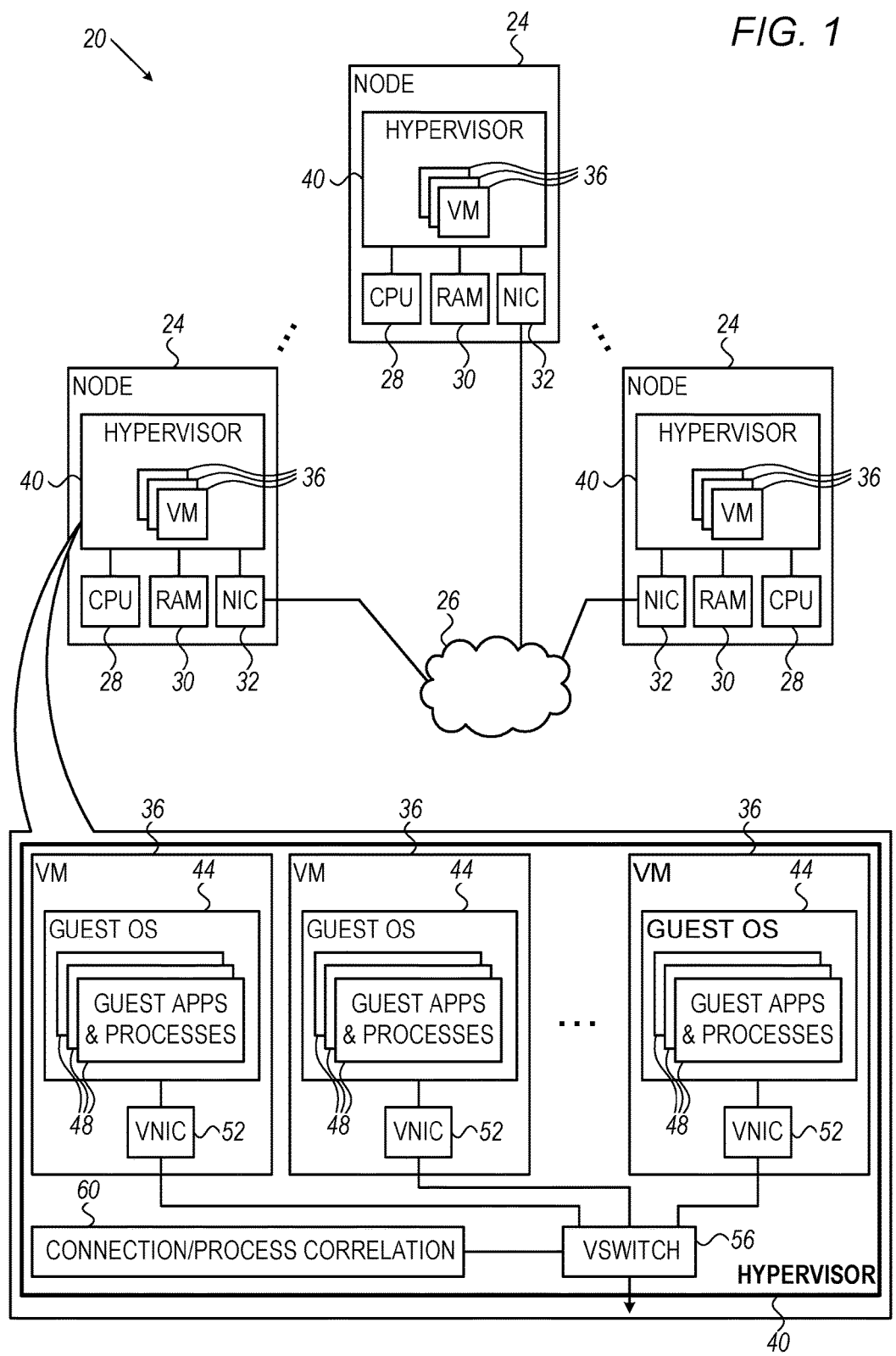
FIG. 1 is a block diagram that schematically illustrates a computing system, in accordance with an embodiment of the present invention.

FIG. 1 is a block diagram that schematically illustrates a computing system 20, in accordance with an embodiment of the present invention. In the present example, system 20 comprises a cloud-based virtualized data center. In alternative embodiments, the disclosed techniques can be applied in any other suitable type of virtualized computing system.

In the example of FIG. 1, system 20 comprises multiple computers 24, referred to as compute nodes or simply nodes for brevity. Nodes 24 may comprise, for example, servers, workstations or any other suitable type of computer. Nodes 24 are interconnected by a communication network 26. The figure shows only three compute nodes for simplicity, but real-life systems often comprise a large number of compute nodes. The disclosed techniques can be used with any desired number of nodes, and even with a system that comprises only a single node.

Each node 24 comprises physical resources such as a Central Processing Unit (CPU) 28, a memory such as Random Access Memory (RAM) 30, a Network Interface Controller (NIC) 32, and persistent storage (e.g., disk—not shown). CPU 28 of each node 24 runs a hypervisor 40 that is configured to host one or more Virtual Machines (VMs) 36. Hypervisor 40 serves as a virtualization layer that allocates physical resources (e.g., CPU, storage, memory and network resources) to the VMs it hosts. Hypervisor 40 may comprise, for example, ESXi, QEMU-KVM, Xen, or any other suitable type of hypervisor.

An inset at the bottom of FIG. 1 shows the internal structure of hypervisor 40 and VMs 36 in greater detail. The various hypervisors 40 and VMs 36 across nodes 24 of system 20 typically have similar structure. Each VM 36 runs a virtual Operating System (OS), referred to as a "guest OS" 44. Guest OS 44 may comprise, for example, a variant of Linus or Windows OS, a FreeBSD or other Unix-related OS, or any other suitable type of OS. The guest OS may run, for example, on top of virtualized or para-virtualized x86 or x64 hardware, or any other suitable virtualized hardware.

Each guest OS 44 runs one or more user applications and processes 48. The various applications and processes running in guest OS 44 are referred to as "processes" or "VM processes." Generally, processes may be part of user applications, or internal OS processes, or any other suitable type of processes.

Each VM 36 further runs a virtual NIC (VNIC) 52 that handles the communication connections of the VM. VNIC 52 is also referred to as a Virtual Interface (VIF). Using VNICs 52, VMs 36 communicate with one another, either on the same node 24 or across different nodes, as well as with other entities inside or outside system 20.

In some embodiments, hypervisor 40 comprises a virtual switching fabric, referred to herein as a virtual switch (VSWITCH) 56. This fabric may comprise one or more interconnected virtual network switches and/or virtual bridges, via which VMs 36 of the node communicate with one another and with VMs or other entities external to the node. The various communication connections used by VMs 36 pass through this VSWITCH. Some of the connections may be established between VMs 36 on the same node 24, i.e., both ends of the connection reside on the same node. Other connections may have one end (VM 36) on a certain node 24 and the other end on a different node (or possibly outside system 20 altogether). VSWITCH 56 may comprise, for example, one or more layer-2 or layer-3 packet switches, and is typically implemented in software.

In some embodiments, hypervisor 40 further comprises a correlation module 60. Module 60 correlates communication connections that terminate in the VMs of the local hypervisor, with the respective VM processes that hold the connection ends. Example correlation methods that may be employed by module 60 are explained in detail below. The correlations established by module 60 may be used for any suitable purpose. For example, the correlations may be reported to a security system or network management system.

The configurations of system 20, nodes 24 and hypervisors 40, shown in FIG. 1, are example configurations that are depicted purely for the sake of conceptual clarity. In alternative embodiments, any other suitable configurations can be used. The different elements shown in FIG. 1 may be implemented using any suitable hardware, such as using one or more Application-Specific Integrated Circuits (ASIC) or Field-Programmable Gate Arrays (FPGA). Alternatively, the various system elements can be implemented using software, or using a combination of hardware and software elements.

In some embodiments, CPUs 28 (on which hypervisors 40 and their various elements run) comprise programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Correlation of Network Connections and Vm Processes

Top-Level Process Description

Figure 2:
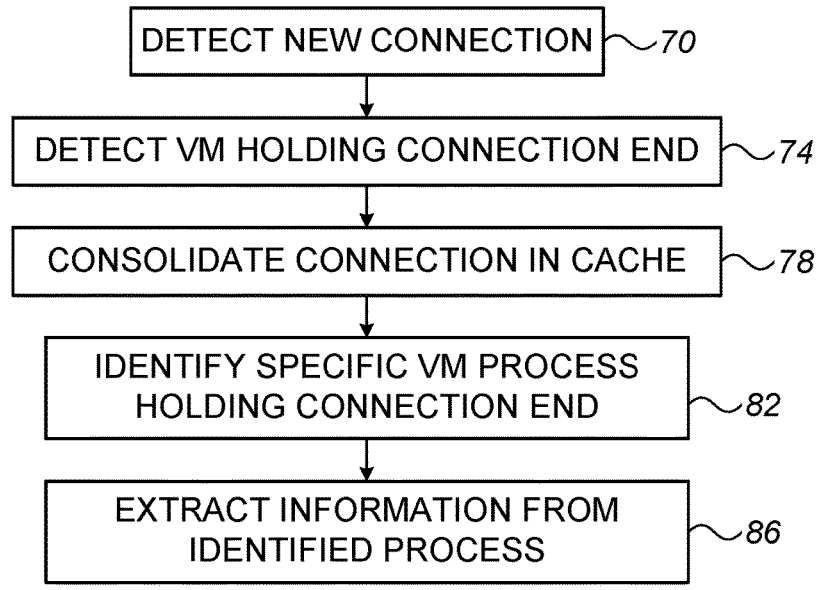
FIG. 2 is a flow chart that schematically illustrates a method for correlating network connections with Virtual Machine (VM) processes, in accordance with an embodiment of the present invention.

FIG. 2 is a flow chart that schematically illustrates a method for correlating network connections with VM processes, in accordance with an embodiment of the present invention. The method is carried out by correlation module 60 in a given hypervisor 40 of a given node 24. The description of FIG. 2 outlines the top-level process. A detailed explanation of each stage of the process is provided further below.

For clarity, the method description refers to a case in which one end of a network connection is held by a VM hosted by the hypervisor in question. When the network connection is set-up between two VMs on the same hypervisor, module 60 of that hypervisor will typically carry out the method twice, once for each end of the connection.

In the present context, the term "network connection" (also referred to simply as "connection" for brevity) refers to a communication session held during a certain time period between a VM hosted by hypervisor 40 and at least one other VM or other entity. Network connections may be set-up and conducted using various protocols, such as Transmission Control Protocol (TCP), User Datagram Protocol (UDP) or Internet Control Message Protocol (ICMP). In the present context, the terms "a VM/process holding the connection end" and "a VM/process terminating the connection" are used interchangeably.

The method of FIG. 2 begins with module 60 detecting that a new network connection was established with one of the VMs hosted by hypervisor 40, at a connection detection step 70. The connection may be initiated by this VM, or by the VM (or other entity) at the other end of the connection.

In response to detecting a new connection, module 60 proceeds to identify the VM that holds the connection end, i.e., the VM with which the connection is established, at a VM identification step 74. Typically, module 60 identifies the VNIC 52 on which the new connection was detected.

At a cache consolidation step 78, module 60 checks whether the new connection was already detected in the recent past. In these embodiments, module 60 caches information relating to previously-detected connections. Caching this information reduces access to the VM guest OS, and therefore reduces the latency of the correlation process. Example caching schemes, are related processes of accessing the VM guest OS, are described in detail below.

At a process identification step 82, module 60 identifies the specific process within the quest OS (of the VM identifies at step 74) that holds the end of the connection. As will be elaborated below, this process involves determining the virtual addresses and corresponding physical addresses in which the connection parameters are stored in the VM memory. The output of this step typically comprises a Process Identifier (PID) of the process.

At an information extraction step 86, module 60 extracts from the VM memory various parameters of the process based on the PID. Process parameters may comprise, for example, the process name, command-line arguments, image path, image information, open files, and/or any other suitable parameters of interest.

Module 60 typically extracts the process parameters by accessing some suitable data structure directly in the memory allocated to the VM by the hypervisor. The term "directly" means that module 60 reads the process parameters from the appropriate physical addresses of the memory. Schemes for determining the physical addresses in which the data structures are stored, and caching schemes for caching this information, are described below.

At this stage, module 60 has established a correlation between the new network connection and the specific VM process that uses it. Module 60 may output this correlation to some external processor or system, and/or act upon the correlation in any suitable way.

In various embodiments, module 60 and/or an external processor may use the correlations between network connections and VM processes for the following example uses:

Detecting a previously unknown process that generates traffic to certain network services (e.g., file servers). This sort of process may be indicative of an infection attempt.

Detecting on a server a new non-system process, which receives connections on high port numbers from another server. This sort of process may be indicative of a backdoor.

Identifying and listing processes that generate repeated failed connections. Such a list can be used to find improperly-configured applications that should be repaired.

Identifying and listing processes that generate failed connections to multiple network addresses. This list can be used for detecting malware that scans the network.

Detection such a process can trigger containment of the server running the process and inspection of the process image and its source.

The use cases above are depicted purely by way of example. Additionally or alternatively, module 60 and/or an external processor may use the correlations between network connections and VM processes for any other suitable purpose. Some other use cases and applications may pertain to VM services health monitoring, rootkit detection for VMs, and agentless antivirus for VMs, for example.

New Connection Detection

In various embodiments, module 60 may detect new connections in various ways. In some embodiments, module identifies new connections by monitoring the communication packets that are transmitted and received by VNICs 52 of the various VMs. Module 60 may monitor these packets, for example, by monitoring the packets traversing VSWITCH 56.

Typically, VSWITCH 56 analyzes the header of each packet it receives, in order to determine the next network hop over which the packet should be forwarded. In some embodiments, module 60 analyzes the headers of the various packets traversing VSWITCH 56, in order to detect new connections.

In an embodiment, module 60 detects new connections by applying stateful firewall analysis to the packet headers. A stateful firewall analysis process typically holds a respective state per active network connection, and associates packets to connections. The process may decide, per packet, whether the packet is part of an active connection, creates a new connection, or violates the connection protocol.

Stateful firewall analysis may be implemented in various ways, and is usually tailored to the specific type of hypervisor. In QEMU-KVM hypervisors, for example, stateful firewall analysis can be performed using the iptables conntrack module, which can be intercepted externally using any suitable monitoring logic through a NFQUEUE mechanism. As another example, in ESX hypervisors stateful firewall analysis can be performed using the dvFilter mechanism. Further alternatively, module 60 may detect new connections using any other suitable mechanism.

Since the disclosed techniques analyze only the packet headers and not the packet payloads, they involve zero packet copying. Moreover, these techniques are distinctly different from Deep Packet Inspection (DPI) techniques that analyze packet payloads.

In an embodiment, the output of the connection detection stage is a full tuple that specifies the new connection and comprises the following parameters:

Name and/or ID of the VNIC (VIF) on which the new connection was detected.
Source MAC address.
Destination MAC address.
IEEE 802.11q Virtual Local Area Network (VLAN) ID (optional).
Internet Protocol (IP) version (IPv4 or IPv6).
IP protocol (e.g., ICMP, UDP or TCP).
Source IP address.
Destination IP address.
Source port (optional).
Destination port (optional).

Connection End(s) Identification

Having detected a new connection, module 60 typically proceeds to identify the two ends of the connection. At least one of these ends is a VM running locally on hypervisor 40. Module 60 may identify the VM holding the connection end based on various parameters of the connection, for example based on the name or ID of the VIF, or based on the source and/or destination MAC address.

Process Identification and Process Information Extraction, Including Reconstruction of Virtual-to-Physical Address Translation Up to this stage of the correlation process, module 60 has detected a new network connection, and has identified the specific VM 36 that holds the end of the new connection. In the following stage, module 60 pinpoints the specific process 48, within guest OS 44 of the identified VM 36, which holds the connection end.

The process of identifying the specific VM process, and of extracting relevant information from the identified process, is typically dependent on factors such as (i) the specific type and version of the guest OS, (ii) the architecture of the virtualized VM hardware, and in particular the memory-space address size (e.g., 32-bit or 64-bit), and (iii) the specific layout of the guest OS memory.

Typically, module 60 identifies the process by accessing one or more data structures (also referred to as "kernel objects") of guest OS 44 of the identified VM. Module 60 typically accesses the data structures directly in the memory allocated to the hypervisor, by reading the appropriate physical memory addresses. The guest OS, on the other hand, allocates memory for the data structures, and accesses the data structures, using virtual memory addressing.

To further complicate the situation, the virtual addresses in which the data structures of interest are stored, and the translation from the virtual addresses to the corresponding physical addresses, may vary between different guest OS types and versions, between individual guest OS instances, as well as over time within a given guest OS instance. Moreover, the size and content of the data structures may vary between different guest OS types and versions, between individual guest OS instances, and over time within a given guest OS instance.

For example, in Linux guest OSs, VM processes are specified in a kernel object called task_struct. When a Linux guest OS is compiled with a flag for supporting Symmetric Multi-Processing (SMP), the field that stores the process name in task_struct is offset by some twenty bytes from the base address of the task_struct object. In Windows guest OSs, the source code for compiling the kernel is not publically available, and therefore information of this sort has to be deduced indirectly.

Thus, in some embodiments module 60 reconstructs the physical addresses of the desired data structures in memory, for a particular guest OS instance at a particular point in time. Using the reconstructed physical addresses, module 60 is able to access the guest OS data structure directly in memory, and obtain the desired process information from the OS data structures.

In various embodiments, module 60 may determine the physical addresses, for a particular guest OS instance at a particular point in time, in various ways. In one embodiment, module 60 creates a clone of the guest OS instance (typically clones the entire VM), and creates within the clone a process that queries the guest OS for the physical addresses of the desired data structures. The process typically exports the physical addresses to module 60 and terminates.

In another embodiment, module 60 accesses a virtual disk that is allocated by hypervisor 40 to the guest OS instance. On the virtual disk, module 60 accesses one or more files that hold the physical addresses of the desired data structures. For example, some Linux guest OSs store a file named "/boot/System.map-<kernel-version>" that holds a mapping between kernel objects, symbols and their absolute physical addresses in memory. A file named "/boot/config-<kernel-version>" holds the configuration flags used for building the kernel image. By accessing these two files, module 60 is able to determine the physical addresses of kernel objects, even though the addresses vary between individual OS instances and/or over time. Yet another file that can be used for this purpose is "/boot/vmlinuz/-<kernel-version>", which holds a compressed binary image of the kernel. In an embodiment, module 60 calculates a signature (e.g., hash) over this file, and uses the signature as a key for accessing a database of guest OS parameters.

In yet other embodiments, module 60 may use any other suitable technique for determining the physical addresses of desired kernel objects that hold the process information, for a particular guest OS instance at a particular point in time.

Having determined the appropriate physical addresses of the kernel objects, for the VM identified as holding the end of the connection, module 60 may access the kernel objects to identify the specific process holding the connection end. In one example embodiment, module 60 accesses a kernel object that holds a list of the currently-active processes in the guest OS. Module 60 scans this list to find a process, which holds a network socket that matches the parameters of the tuple extracted from the new connection. Module 60 identifies this process as the process that holds the end of the new connection.

In another embodiment, module 60 accesses a kernel object that holds a TCP lookup table in the TCP/IP stack of the guest OS. In this embodiment, module 60 calculates a hash over a header of a packet belonging to the new connection, and queries the TCP lookup table with this hash. If a match is found, module 60 regards the process indicated in the matching entry as the process that holds the end of the new connection.

Further alternatively, module 60 may access any other suitable kernel object, in any other suitable way, for identifying the process that holds the end of the new network connection.

Caching of Guest OS Information

In some embodiments, module 60 maintains a cache memory that caches reconstructed physical addresses of various OS data structures ("kernel objects"), and possibly additional guest OS parameters. This caching scheme avoids unnecessary access by module 60 to the guest VM in the hypervisor memory. As a result, the correlation process can be performed with minimal latency, e.g., in real-time. The cache memory can be implemented in a region of memory allocated for this purpose in RAM 30 of node 24.

In an example embodiment, module 60 may cache the following parameters (or a subset of the parameters, as they become available from previous read operations) per guest OS:
  Guest OS type and version number.
  Fixed virtual addresses of guest OS kernel objects, e.g., base address of process structure linked list, network socket hash list, and others. Typically, kernel objects that specify information relating to network connections are of interest.

Virtual-to-physical memory address translations for the addresses of the kernel objects.

Virtual-to-physical memory address translations for user-mode objects.

Typically, module 60 fills these cached values incrementally as the guest OSs are accessed, and updates the cached values over time. When a certain VM is terminated, module 60 invalidates the cache entries relating to the guest OS of this VM.

Figure 3:
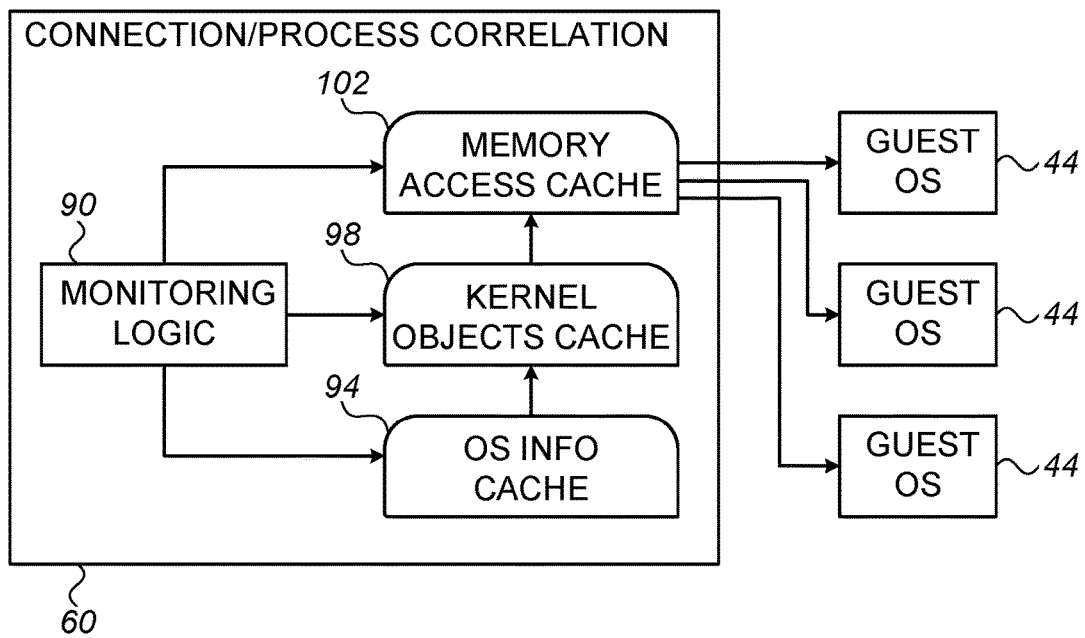
FIG. 3 is a block diagram that schematically illustrates elements of a hypervisor used for accessing a VM guest Operating System (OS), in accordance with an embodiment of the present invention.

FIG. 3 is a block diagram that schematically illustrates a caching scheme used by module 60 for accessing VM guest Operating Systems (OSs) 44, in accordance with an embodiment of the present invention. In the present example, module 60 comprises monitoring logic 90, which carries out the disclosed techniques, and a three-level cache. The three-level cache comprises an OS info cache 94, a kernel objects cache 98 and a memory access cache 102.

OS info cache 94 caches various OS parameters, per each type and version number of guest OS. The parameters cached in cache 94 are those that are not expected to vary between individual guest OS instances of the same type and version. Such parameters may comprise, for example, the base address for the OS task list, the address of the current running CPU descriptor, and various others. In one embodiment, system 20 or some external system determines these parameters by examining a large number of guest OS instances, e.g., across the entire system 20. This process may be performed off-line. In other embodiments, each module 60 determines this information individually over the guest OS instances on the specific node 24.

Kernel objects cache 98 caches, per each individual guest OS instance 44 in hypervisor 40, the virtual addresses of various kernel objects. In particular, kernel objects cache 98 caches the virtual addresses of data structures that hold process information. Memory access cache 102 caches, per each individual guest OS 44 in hypervisor 40, the translation between virtual addresses and corresponding physical addresses in memory.

In this embodiment, monitoring logic 90 of module 60 accesses the various guest OSs on its node 24 via the three-level cache. Before accessing a certain guest OS, processing logic 90 checks whether the desired OS information is already available in cache 94, 98 and/or 102. If available, processing logic 90 reads the OS information from the cache and refrains from accessing the guest OS. Otherwise, processing logic 90 accesses the guest OS to retrieve the information, and updates cache 94, 98 and/or 102 with the retrieved OS information.

The caching scheme shown in FIG. 3 is chosen purely for the sake of conceptual clarity. In alternative embodiments, module 60 may use any other caching scheme, or it may operate without caching altogether.

In one alternative embodiment, module 60 detects a network connection that is associated with a certain VM by monitoring the VM memory in a polling manner. In this embodiment, module 60 periodically polls regions of the VM memory, which contain connections tables or other data structures that specify network connections.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a computer, running a hypervisor that allocates resources of a memory and of a network to one or more Virtual Machines (VMs), which run VM processes and communicate over network connections;
identifying, by monitoring the network connections in the hypervisor, a VM that is associated with a given network connection;
identifying that the given network connection is associated with a given VM process, by:
reconstructing a physical address of a data structure in a region of the memory assigned to the identified VM, wherein the data structure is managed by a guest operating system of the identified VM and indicates the given process, and wherein reconstructing the physical address is performed by accessing the guest operating system via a cache that caches previously-reconstructed physical addresses; and
directly accessing the data structure, in the hypervisor, at the physical address; and
establishing an association between the given network connection and the given VM process.

2. The method according to claim 1, wherein reconstructing the physical address comprises cloning the guest operating system, and creating in the cloned guest operating system a process that queries the cloned guest operating system for the physical address and exports the queried physical address.

3. The method according to claim 1, wherein reconstructing the physical address comprises accessing, on a virtual disk allocated to the guest operating system, a file that indicates the physical address.

4. The method according to claim 1, wherein accessing the data structure comprises finding a match to one or more parameters of the given connection in a list of currently-active processes of the guest operating system.

5. The method according to claim 1, wherein accessing the data structure comprises finding a match to one or more parameters of the given connection in a Transmission Control Protocol/Internet Protocol (TCP/IP) lookup table of the guest operating system.

6. The method according to claim 1, wherein identifying that the given network connection is associated with a given VM process comprises periodically polling the region of the memory.

7. An apparatus, comprising:
a memory; and
a processor, configured to:
run a hypervisor that allocates resources of the memory and of a network to one or more Virtual Machines (VMs), which run VM processes and communicate over network connections;
identify, by monitoring the network connections in the hypervisor, a VM that is associated with a given network connection;
identify that the given network connection is associated with a given VM process, by:
reconstructing a physical address of a data structure in a region of the memory assigned to the identified VM, wherein the data structure is managed by a guest operating system of the identified VM and indicates the given process, and wherein reconstructing the physical address is performed by accessing the guest operating system via a cache that caches previously-reconstructed physical addresses; and directly accessing the data structure, in the hypervisor, at the physical address; and establish an association between the given network connection and the given VM process.

8. The apparatus according to claim 7, wherein the processor is configured to reconstruct the physical address by cloning the guest operating system, and creating in the cloned guest operating system a process that queries the cloned guest operating system for the physical address and exports the queried physical address.

9. The apparatus according to claim 7, wherein the processor is configured to reconstruct the physical address by accessing, on a virtual disk allocated to the guest operating system, a file that indicates the physical address.

10. The apparatus according to claim 7, wherein the data structure comprises a list of currently-active processes of the guest operating system, and wherein the processor is configured to find a match to one or more parameters of the given connection in the list of currently-active processes.

11. The apparatus according to claim 7, wherein the data structure comprises a Transmission Control Protocol/Internet Protocol (TCP/IP) lookup table of the guest operating system, and wherein the processor is configured to find a match to one or more parameters of the given connection in the TCP/IP lookup table.

12. The apparatus according to claim 7, wherein the processor is configured to identify that the given network connection is associated with a given VM process by periodically polling the regions of the memory.

13. A computer software product, the product comprising a tangible non-transitory computer-readable medium in which program instructions are stored, which instructions, when read by a processor, cause the processor to:

run a hypervisor that allocates resources of the memory and of a network to one or more Virtual Machines (VMs), which run VM processes and communicate over network connections;

identify, by monitoring the network connections in the hypervisor, a VM that is associated with a given network connection;

identify that the given network connection is associated with a given VM process, by:

reconstructing a physical address of a data structure in a region of the memory assigned to the identified VM, wherein the data structure is managed by a guest operating system of the identified VM and indicates the given process, and wherein reconstructing the physical address is performed by accessing the guest operating system via a cache that caches previously-reconstructed physical addresses; and directly accessing the data structure, in the hypervisor, at the physical address; and establish an association between the given network connection and the given VM process.

* * * * *